(12) United States Patent
Hooper

(10) Patent No.: US 7,006,495 B2
(45) Date of Patent: Feb. 28, 2006

(54) TRANSMITTING MULTICAST DATA PACKETS

(75) Inventor: Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 738 days.

(21) Appl. No.: 09/945,575

(22) Filed: Aug. 31, 2001

(65) Prior Publication Data

US 2003/0043803 A1 Mar. 6, 2003

(51) Int. Cl.
*H04L 12/28* (2006.01)

(52) U.S. Cl. .................. 370/389; 370/312; 370/392

(58) Field of Classification Search ............. 370/312, 370/389, 392, 412, 428, 429, 432
See application file for complete search history.

(56) References Cited

U.S. PATENT DOCUMENTS

| 5,379,295 | A | * | 1/1995 | Yonehara ................. 370/400 |
| 5,539,737 | A | | 7/1996 | Lo et al. | |
| 5,852,820 | A | | 12/1998 | Burrows | |
| 5,898,686 | A | | 4/1999 | Virgile | |
| 5,987,454 | A | | 11/1999 | Hobbs | |
| 5,987,480 | A | | 11/1999 | Donohue et al. | |
| 6,047,286 | A | | 4/2000 | Burrows | |
| 6,320,861 | B1 | * | 11/2001 | Adam et al. ............. 370/395.7 |
| 6,754,211 | B1 | * | 6/2004 | Brown ..................... 370/389 |
| 6,754,222 | B1 | * | 6/2004 | Joung et al. .............. 370/412 |
| 6,856,622 | B1 | * | 2/2005 | Calamvokis et al. ...... 370/390 |
| 6,873,618 | B1 | * | 3/2005 | Weaver ................... 370/390 |
| 2001/0023487 | A1 | * | 9/2001 | Kawamoto ................ 713/202 |
| 2002/0075878 | A1 | * | 6/2002 | Lee et al. ................. 370/401 |
| 2002/0118692 | A1 | * | 8/2002 | Oberman et al. .......... 370/419 |
| 2003/0161337 | A1 | * | 8/2003 | Weinman .................. 370/432 |

FOREIGN PATENT DOCUMENTS

| EP | 0 773 648 A1 | 5/1997 |
| WO | WO 00/56024 | 9/2000 |

* cited by examiner

*Primary Examiner*—Chi Pham
*Assistant Examiner*—Kamran Emdadi
(74) *Attorney, Agent, or Firm*—Fish & Richardson P.C.

(57) ABSTRACT

A method of transmitting data packets includes using one or more receive processors to receive a plurality of data packets from a network and processing the plurality of data packets using a management processor. The method also includes using one or more transmit processors to transmit packets to the network.

24 Claims, 3 Drawing Sheets

TRANSMITTING MULTICAST DATA PACKETS

TECHNICAL FIELD

This invention relates to transmitting multicast data packets.

BACKGROUND

Networking routers collect packet data from incoming network device ports and queue the packet data for transfer to appropriate forwarding device ports. Routers also process the packet data, that is, parsing the data and making forwarding decisions. Some implementations of these functions usually involve the development of ASIC or custom devices.

Messages are sent using multicast packets or unicast packets. Multicast packets are intended for more than one receiver. Unicast messages have just one receiver.

DESCRIPTION

Figure 1:
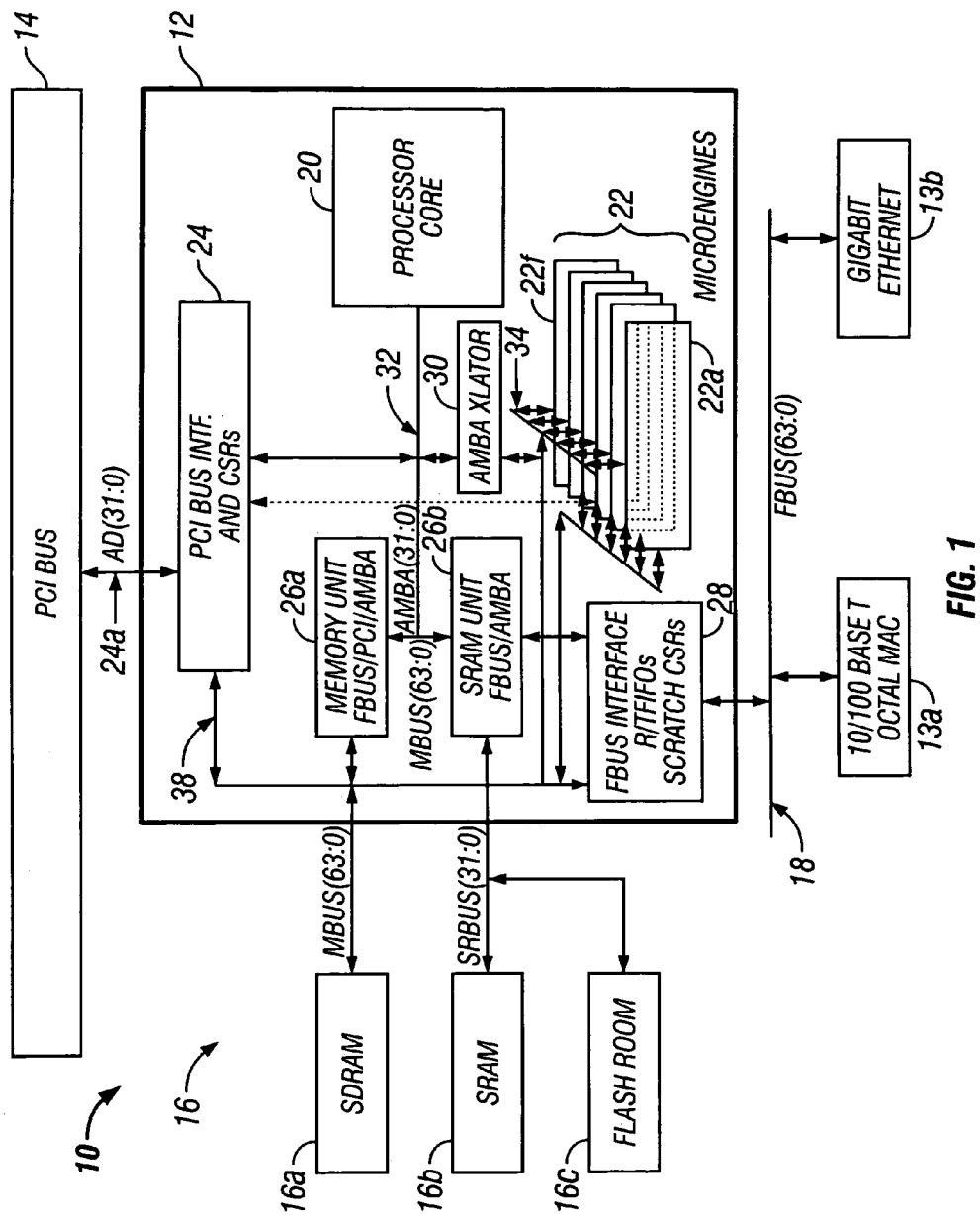
FIG. 1 is a block diagram of hardware-based multithreaded processor.

Referring to FIG. 1, a communication system 10 includes a parallel, hardware-based multithreaded processor 12. The hardware-based multithreaded processor 12 is coupled to a bus such as a PCI bus 14, a memory system 16 and a second bus 18. The system 10 is especially useful for tasks that can be broken into parallel subtasks or functions. Specifically hardware-based multithreaded processor 12 is useful for tasks that are bandwidth oriented rather than latency oriented. The hardware-based multithreaded processor 12 has multiple microengines 22 each with multiple hardware controlled threads that can be simultaneously active and independently work on a task.

The hardware-based multithreaded processor 12 also includes a central controller (core) 20 that assists in loading microcode control for other resources of the hardware-based multithreaded processor 12. The processor 20 can perform other general purpose computer type functions such as handling protocols, exceptions and extra support for packet processing where the microengines pass the packets off for more detailed processing such as in boundary conditions. In one embodiment, the processor 20 is a Strong Arm® (Arm® is a trademark of ARM Limited, United Kingdom) based architecture. The general purpose microprocessor 20 has an operating system. Through the operating system the processor 20 can call functions to operate on microengines 22a–22f. The processor 20 can use any supported operating system preferably a real time operating system. For the core processor implemented as a Strong Arm architecture, operating systems such as, MicrosoftNT real-time, VXWorks and CUS, a freeware operating system available over the Internet, can be used.

The hardware-based multithreaded processor 12 also includes a plurality of function microengines 22a–22f. Functional microengines (microengines) 22a–22f each maintain a plurality of program counters in hardware and states associated with the program counters. Effectively, a corresponding plurality of sets of threads can be simultaneously active on each of the microengines 22a–22f while only one is actually operating at any one time.

In one embodiment, there are six microengines 22a–22f as shown. Each microengines 22a–22f has capabilities for processing four hardware threads. The six microengines 22a–22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM memory 16a and SDRAM controller 26a are typically used for processing large volumes of data, e.g., processing of network payloads from network packets. The SRAM controller 26b and SRAM memory 16b are used in a networking implementation for low latency, fast access tasks, e.g., accessing look-up tables, memory for the core processor 20, and so forth.

The six microengines 22a–22f access either the SDRAM 16a or SRAM 16b based on characteristics of the data. Thus, low latency, low bandwidth data is stored in and fetched from SRAM, whereas higher bandwidth data for which latency is not as important, is stored in and fetched from SDRAM. The microengines 22a–22f can execute memory reference instructions to either the SDRAM controller 26a or SRAM controller 16b.

Advantages of hardware multithreading can be explained by SRAM or SDRAM memory accesses. As an example, an SRAM access requested by a Thread_0, from a microengine will cause the SRAM controller 26b to initiate an access to the SRAM memory 16b. The SRAM controller controls arbitration for the SRAM bus, accesses the SRAM 16b, fetches the data from the SRAM 16b, and returns data to a requesting microengine 22a–22b. During an SRAM access, if the microengine e.g., 22a had only a single thread that could operate, that microengine would be dormant until data was returned from the SRAM. By employing hardware context swapping within each of the microengines 22a–22f, the hardware context swapping enables other contexts with unique program counters to execute in that same microengine. Thus, another thread e.g., Thread_1 can function while the first thread, e.g., Thread_0, is awaiting the read data to return. During execution, Thread_1 may access the SDRAM memory 16a. While Thread_1 operates on the SDRAM unit, and Thread_0 is operating on the SRAM unit, a new thread, e.g., Thread_2 can now operate in the microengine 22a. Thread_2 can operate for a certain amount of time until it needs to access memory or perform some other long latency operation, such as making an access to a bus interface. Therefore, simultaneously, the processor 12 can have a bus operation, SRAM operation and SDRAM operation all being completed or operated upon by one microengine 22a and have one more thread available to process more work in the data path.

The hardware context swapping also synchronizes completion of tasks. For example, two threads could hit the same shared resource e.g., SRAM. Each one of these separate functional units, e.g., the FBUS interface 28, the SRAM controller 26a, and the SDRAM controller 26b, when they complete a requested task from one of the microengine thread contexts reports back a flag signaling completion of an operation. When the flag is received by the microengine, the microengine can determine which thread to turn on.

One example of an application for the hardware-based multithreaded processor 12 is as a network processor. As a network processor, the hardware-based multithreaded processor 12 interfaces to network devices such as a media access controller device e.g., a 10/100BaseT Octal MAC 13a or a Gigabit Ethernet device 13b. In general, as a network processor, the hardware-based multithreaded processor 12 can interface to any type of communication device or interface that receives/sends large amounts of data. Communication system 10 functioning in a networking application could receive a plurality of network packets from the devices 13a, 13b and process those packets in a parallel manner. With the hardware-based multithreaded processor 12, each network packet can be independently processed.

Another example for use of processor 12 is a print engine for a postscript processor or as a processor for a storage subsystem, i.e., RAID disk storage. A further use is as a matching engine. In the securities industry for example, the advent of electronic trading requires the use of electronic matching engines to match orders between buyers and sellers. These and other parallel types of tasks can be accomplished on the system 10.

The processor 12 includes a bus interface 28 that couples the processor to the second bus 18. Bus interface 28 in one embodiment couples the processor 12 to the so-called FBUS 18 (FIFO bus). The FBUS interface 28 is responsible for controlling and interfacing the processor 12 to the FBUS 18. The FBUS 18 is a 64-bit wide FIFO bus, used to interface to Media Access Controller (MAC) devices.

The processor 12 includes a second interface e.g., a PCI bus interface 24 that couples other system components that reside on the PCI 14 bus to the processor 12. The PCI bus interface 24, provides a high speed data path 24a to memory 16 e.g., the SDRAM memory 16a. Through that path data can be moved quickly from the SDRAM 16a through the PCI bus 14, via direct memory access (DMA) transfers. The hardware based multithreaded processor 12 supports image transfers. The hardware based multithreaded processor 12 can employ a plurality of DMA channels so if one target of a DMA transfer is busy, another one of the DMA channels can take over the PCI bus to deliver information to another target to maintain high processor 12 efficiency. Additionally, the PCI bus interface 24 supports target and master operations. Target operations are operations where slave devices on bus 14 access SDRAMs through reads and writes that are serviced as a slave to target operation. In master operations, the processor core 20 sends data directly to or receives data directly from the PCI interface 24.

Each of the functional units are coupled to one or more internal buses. As described below, the internal buses are dual, 32 bit buses (i.e., one bus for read and one for write). The hardware-based multithreaded processor 12 also is constructed such that the sum of the bandwidths of the internal buses in the processor 12 exceed the bandwidth of external buses coupled to the processor 12. The processor 12 includes an internal core processor bus 32, e.g., an ASB bus (Advanced System Bus) that couples the processor core 20 to the memory controller 26a, 26c and to an ASB translator 30 described below. The ASB bus is a subset of the so called AMBA bus that is used with the Strong Arm processor core. The processor 12 also includes a private bus 34 that couples the microengine units to SRAM controller 26b, ASB translator 30 and FBUS interface 28. A memory bus 38 couples the memory controller 26a, 26b to the bus interfaces 24 and 28 and memory system 16 including flashrom 16c used for boot operations and so forth.

Figure 2:
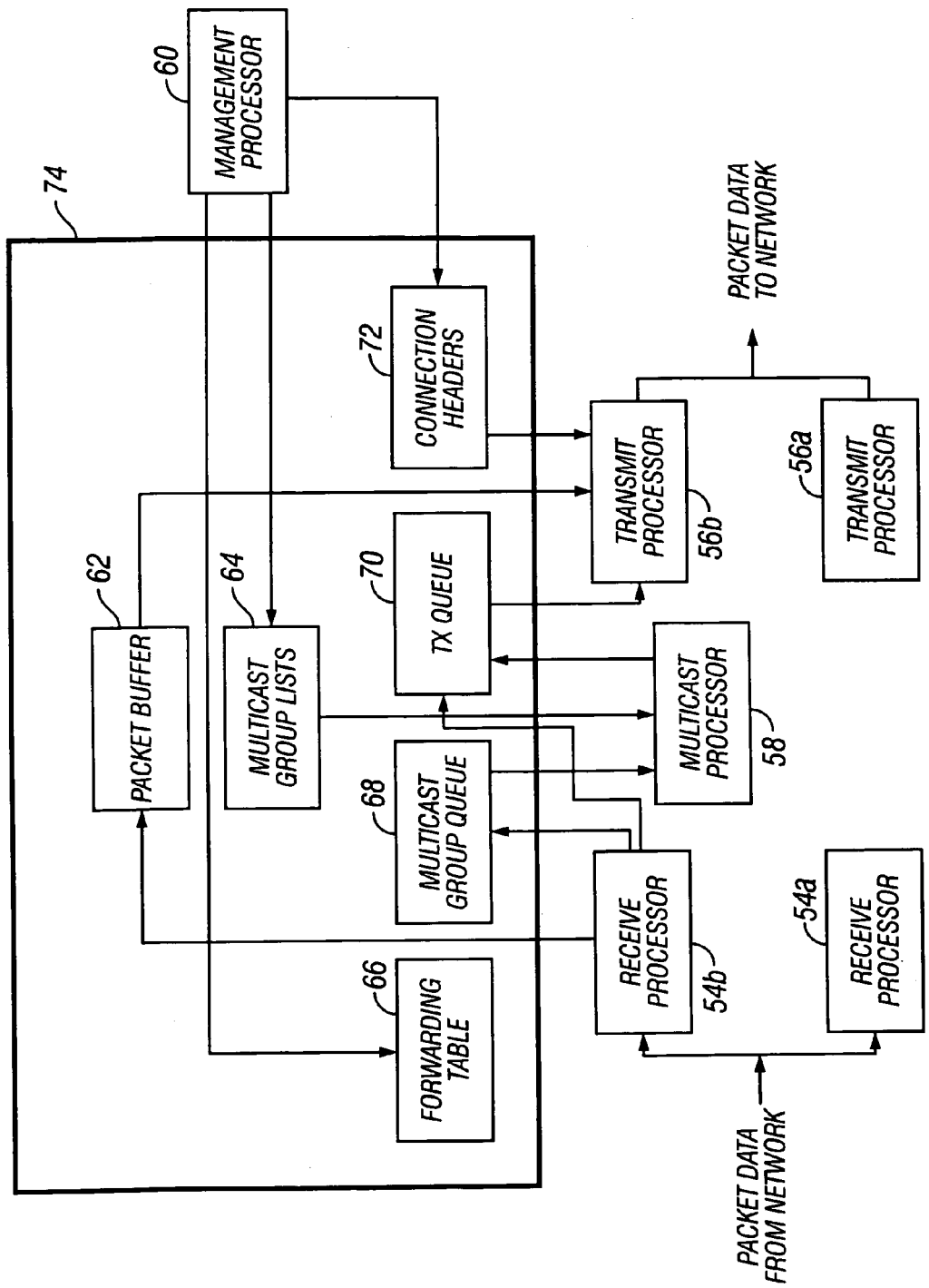
FIG. 2 is a functional diagram of a system for transmitting data packets showing functions that can be executed on the processor of FIG. 1.

Referring to FIG. 2, processes that run on a system 10 such as shown in FIG. 1, for transmitting data packets includes receive processors 54 (e.g., receiver processor 54a and receive processor 54b), transmit processors 56 (e.g., transmit processor 56a and transmit processor 56b), a multicast processor 58, a management processor 60, and shared memory 74. Shared memory 74 includes Static Random Access Memory (SRAM) or Dynamic Random Access Memory (DRAM) or a combination of both, e.g., as mentioned above. A forwarding table 66, a multicast group queue 68, a multicast group list 64, a transmit queue 70 and connection header tables 72 are stored in a shared memory 74.

Management processor 60 updates multicast group list 64, connection header tables 72 and forwarding table 66 from data received from a network. Multicast group lists 64 are implemented as a set of arrays in SRAM where each array is a multicast group. Each entry identifies a destination connection (e.g., virtual circuit) index and connection type (e.g., constant bit rate (CBR), unspecified bit rate (UBR), variable bit rate (VBR), etc.). Connection header tables 72 contain connection headers, where each connection header is the unique header to be prepended to the packet at transmit time.

Figure 3:
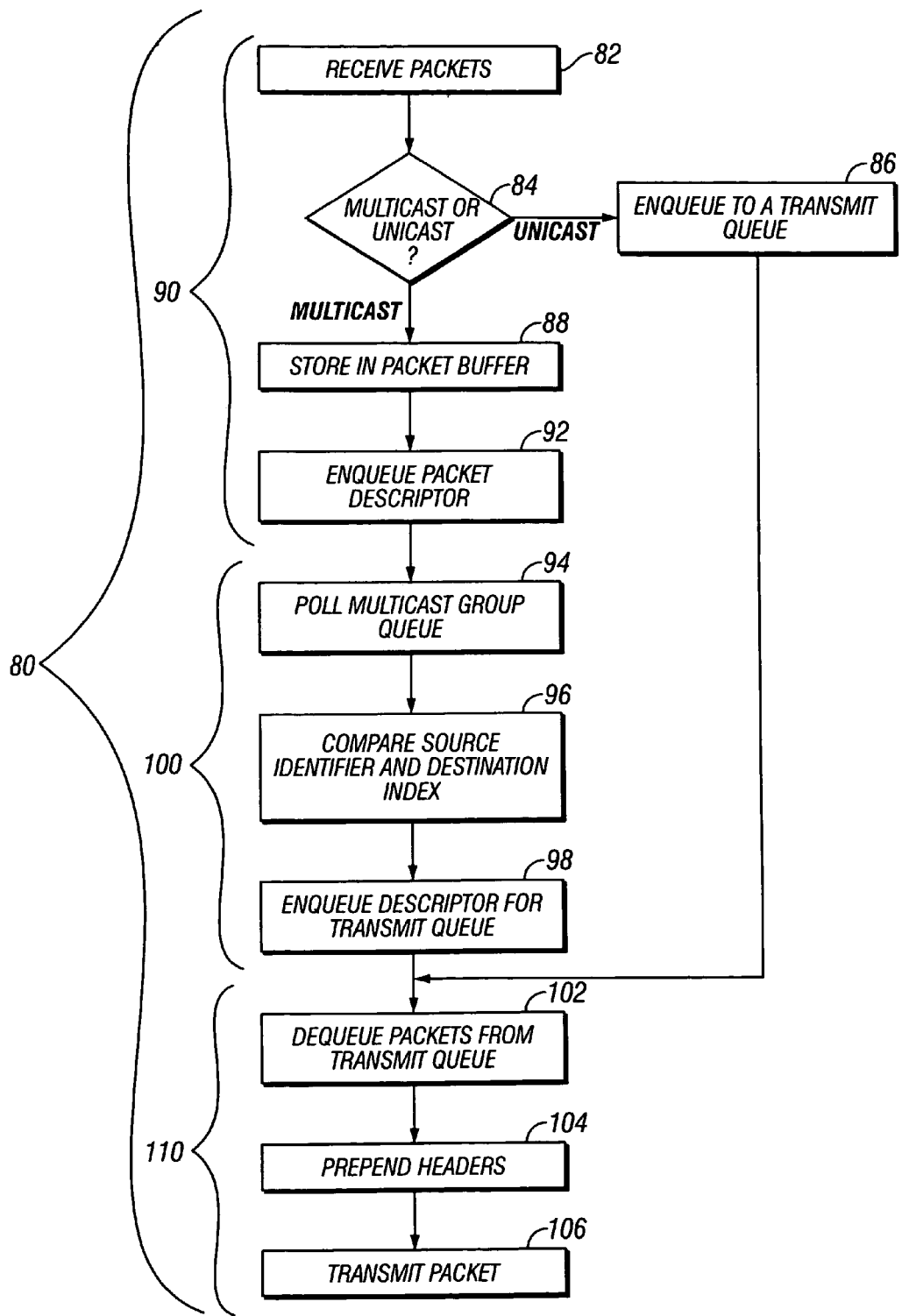
FIG. 3 is a flowchart of a process for transmitting a data packet.

Referring to FIG. 3, a process 80 for transmitting a data packet is shown. Briefly, process 80 starts with the receipt of a packet at receive processors 54a and 54b using subprocess 90. The packet is stored by receive processors 54a and 54b using subprocess 90 in shared memory 74 at packet buffer 62. Multicast processor 58 processes the packet information using subprocess 100. Transmit receivers 56a and 56b prepare and send the data packet to the network using subprocess 110. In other words, a data packet is received, stored, and transmitted to a network using multiple processors.

Subprocess 90 of process 80 receives 82 data packets from the network at receive processors 54a and 54b. Receive processors 54a and 54b perform a look-up on the packet header and obtains a forwarding table entry from forwarding table 66. Process 80 determines 84 whether a message is unicast or multicast by the forward table entry. Process 80 enqueues 86 unicast messages to transmit queue 70. If the message is a multicast message, process 80 stores 88 the packet in a packet buffer 62, which is DRAM. Process 80 enqueues 92 a packet descriptor to multicast group queue 68. Multicast group queue 68 is a linked-list queue that provides elasticity for a non-deterministic number of multicast packets. Receive processors 54a and 54b enqueue unicast and multicast messages at the line rate of the network.

Subprocess 100 of process 80 polls 94 multicast group queue 68 by using multicast processor 58 to determine if there is a multicast packet descriptor present. If the multicast descriptor is present, multicast processor 58 retrieves the multicast packet descriptor. The multicast group descriptor includes a multicast group identifier and a source identifier. For each group identifier, process compares 96 the source identifier with a destination index by having multicast processor 58 analyze multicast group list 64 and make a comparison at each entry in the multicast group list. If there is a match, multicast processor 58 does not enqueue for that destination because the sender would be sending a message back to the sender. Otherwise, multicast processor 58 enqueues 98 the descriptor to transmit queue 70 for CBR, VBR or UBR queue depending on the connection type in the multicast group entry. Multicast packets are enqueued for transmit in the same way as any unicast message except that a separate descriptor is used for each enqueue. Also, there is a primary packet descriptor associated with the packet buffer, which is always allocated each time the packet buffer is allocated, for example, using a buf_pop command in assembly language or in C programming language or other equivalent commands in other programming languages.

Subprocess 110 of process 80 dequeues 102 the packets from transmit queue 70. Subprocess 110 prepends 104 the headers from connection headers table 72. Subprocess 110 transmits 106 the packets to the network. Typically, the packet is transmitted in cells or segments, which are subdivisions of the packet.

Associated with each multicast group is a total transmit count, which is equal to the number of members in the multicast group less one. Accordingly, the total transmit count is the number of times the packet must be transmitted to all but the sender. At enqueue for transit time, the transmit count is stored in the primary packet descriptor. Each time end of protocol data unit (PDU) is reached for a multicast packet, the actual transmit count is decremented. When the actual transmit count reaches zero, the packet buffer and its associated primary descriptor are returned to freelist, for example, using the buf_push command in assembly language or in C programming language or other equivalent commands in other programming languages.

When transmitting multicast packets, each destination can have a different packet header encapsulation. Transmit processors 56a and 56b retrieve the unique header from connection header table 72 and prepend this to the packet payload. The packet payload is the information to be transmitted without header information. To avoid read/modify/writes due to non-quad alignments, receive processors 54a and 54b can align the packet payload to make room for the exact length of the multicast prepend when storing the packet. For multicast groups of different prepend lengths, the multicast group is further divided into one subgroup per prepend length. The packet is aligned by receive processors 54a and 54b and copied once for each prepend length. Thus, one multicast group for the network is represented as several homogeneous groups.

Process 80 is not limited to use with the hardware and software of FIG. 1; it may find applicability in any computing or processing environment and with any type of machine that is capable of performing the described functions. Process 80 may be implemented in hardware, software, firmware or a combination thereof. Process 80 may be implemented in computer programs executed on programmable computers/machines that each includes a processor, a storage medium readable by the processor (including volatile and non-volatile memory and/or storage elements), at least one input device, and one or more output devices. Program code maybe applied to data entered using an input device to perform process 80 and to generate output information.

Each such program may be implemented in a high level procedural or objected-oriented programming language to communicate with a computer system. However, the programs can be implemented in assembly or machine language. The language may be a compiled or an interpreted language. Each computer program may be stored on a storage medium or device (e.g., CD-ROM, hard disk, or magnetic diskette) that is readable by a general or special purpose programmable computer for configuring and operating the computer when the storage medium or device is read by the computer to perform process 80. Process 80 may also be implemented as a machine-readable storage medium, configured with a computer program, where upon execution, instructions in the computer program cause the computer to operate in accordance with process 80.

The invention is not limited to the specific embodiments described herein. The invention is not limited to the specific processing order of FIG. 3. Rather, the blocks of FIG. 3 may be re-ordered, as necessary, to achieve the results set forth above.

Other embodiments not described herein are also within the scope of the following claims.

What is claimed is:

1. A method comprising:
   receiving a plurality of multicast packets;
   storing the plurality of multicast packets and packet descriptors corresponding to each of the multicast packets in a memory, wherein the packet descriptors are stored in a multicast group queue portion of the memory and include a multicast group identifier, a source identifier, and a transmit count identifying a number of times the multicast packet must be transmitted so that each of a plurality of destinations associated with the multicast group identifier receives the multicast packet;
   polling the multicast group queue portion of the memory to determine whether there are any available packet descriptors;
   determining the plurality of destinations associated with an available packet descriptor by comparing the source identifier of the available packet descriptor to a destination index;
   transmitting each of the multicast packets to the determined plurality of destinations;
   decrementing the transmit count in the available packet descriptor each time a corresponding multicast packet is transmitted; and
   allowing a portion of the memory associated with the available packet descriptor and a corresponding multicast packet to be overwritten when the transmit count in the available packet descriptor reaches a predetermined value.

2. A method as in claim 1, further comprising:
   excluding the source as a destination for each of the transmitted multicast packets.

3. A method as in claim 1, wherein the received multicast packets are stored in a packet buffer portion of the memory.

4. A method as in claim 1, further comprising:
   enqueueing packet descriptors in a transmit queue portion of the memory when the source identifier and the destination index do not match.

5. A method as in claim 1, further comprising:
   prepending headers from a connection header table for each multicast packet to be transmitted.

6. A method as in claim 5, further comprising:
   sending updates to a forwarding table, a multicast group list and the connection header table.

7. A method as in claim 6, wherein the multicast group list comprises a plurality of entries including multicast groups stored in the memory.

8. A method as in claim 6, wherein the multicast group list comprises a plurality of entries, each entry identifying a destination connection index and a connection type.

9. An apparatus for transmitting data packets, comprising;
   a processor that executes instructions; and
   a memory that stores executable instructions for causing the processor to:
   receive a plurality of multicast packets;
   store the plurality of multicast packets and packet descriptors corresponding to each of the multicast packets in a memory, wherein the packet descriptors are stored in a multicast group queue portion of the memory and include a multicast group identifier, a source identifier, and a transmit count identifying a number of times the multicast packet must be transmitted so that each of a plurality of destinations associated with the multicast group identifier receives the multicast packet;

poll the multicast group queue portion of the memory to determine whether there are any available packet descriptors;

determine the plurality of destinations associated with an available packet descriptor by comparing the source identifier of the available packet descriptor to a destination index;

transmit each of the multicast packets to the determined plurality of destinations;

decrement the transmit count in the available packet descriptor each time a corresponding multicast packet is transmitted; and allow a portion of the memory associated with the available packet descriptor and a corresponding multicast packet to be overwritten when the transmit count in the available packet descriptor reaches a predetermined value.

10. An apparatus as in claim 9, wherein the memory further stores instructions to cause the processor to:

exclude the source as a destination for the transmitted multicast packets.

11. An apparatus as in claim 9, wherein the received multicast packets are stored in a packet buffer portion of the memory.

12. An apparatus as in claim 9, wherein the memory further stores instructions to cause the processor to:

enqueue packet descriptors in a transmit queue portion of the memory when the source identifier and the destination index do not match.

13. An apparatus as in claim 9, wherein the memory further stores instructions to cause the processor to:

prepend headers from a connection header table for each multicast packet to be transmitted.

14. An apparatus as in claim 13, wherein the memory further stores instructions to cause the processor to:

send updates to a forwarding table, a multicast group list and the connection header table.

15. An apparatus as in claim 14, wherein the multicast group list comprises a plurality of entries including multicast groups stored in the memory.

16. An apparatus as in claim 14, wherein the multicast group list comprises a plurality of entries, each entry identifying a destination connection index and a connection type.

17. An article comprising a machine-readable medium which stores executable instructions to transmit data packets, the instructions causing a machine to:

receive a plurality of multicast packets;

store the plurality of multicast packets and packet descriptors corresponding to each of the multicast packets in a memory, wherein the packet descriptors are stored in a multicast group queue portion of the memory and include a multicast group identifier, a source identifier, and a transmit count identifying a number of times the multicast packet must be transmitted so that each of a plurality of destinations associated with the multicast group identifier receives the multicast packet;

poll the multicast group queue portion of the memory to determine whether there are any available packet descriptors;

determine the plurality of destinations associated with an available packet descriptor by comparing the source identifier of the available packet descriptor to a destination index;

transmit each of the multicast packets to the determined plurality of destinations;

decrement the transmit count in the available packet descriptor each time a corresponding multicast packet is transmitted; and allow a portion of the memory associated with the available packet descriptor and a corresponding multicast packet to be overwritten when the transmit count in the available packet descriptor reaches a predetermined value.

18. An article as in claim 17, further comprising instructions causing a machine to:

exclude the source as a destination for each of the transmitted multicast packets.

19. An article as in claim 17, wherein the received multicast packets are stored in a packet buffer portion of the memory.

20. An article as in claim 17, further comprising instructions causing a machine to:

enqueue packet descriptors in a transmit queue portion of the memory when the source identifier and the destination index do not match.

21. An article as in claim 17, further comprising instructions causing a machine to:

prepend headers from a connection header table for each multicast packet to be transmitted.

22. An article as in claim 21, further comprising instructions causing a machine to:

send updates to a forwarding table, a multicast group list and the connection header table.

23. An article as in claim 22, wherein the multicast group list comprises a plurality of entries including multicast groups stored in the memory.

24. An apparatus as in claim 22, wherein the multicast group list comprises a plurality of entries, each entry identifying a destination connection index and a connection type.

* * * * *